Dec. 6, 1927.
C. PIRQUET
VEHICLE
Filed Oct. 4, 1923
1,651,727
2 Sheets-Sheet 1
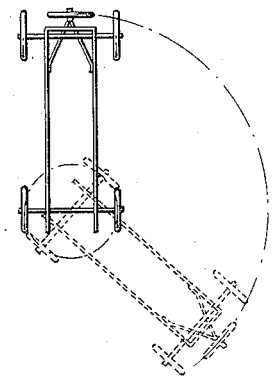
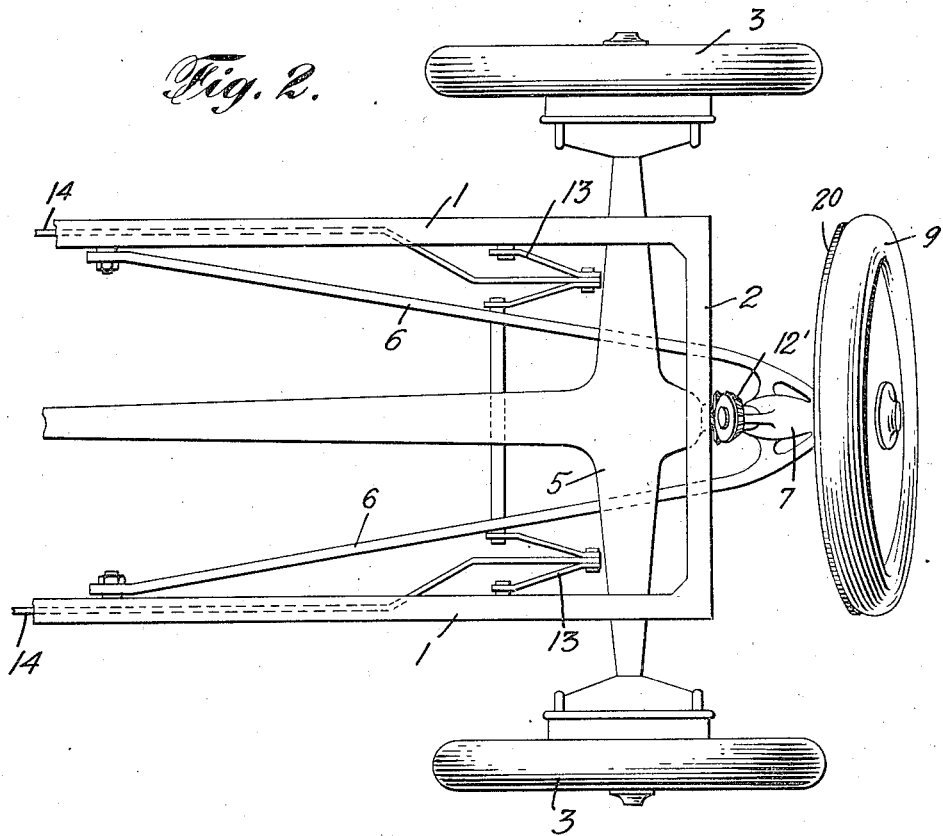
Inventor
Clemens Pirquet
By his Attorneys
Townsend & Decker Dec. 6, 1927.  1,651,727
C. PIRQUET
VEHICLE
Filed Oct. 4, 1923  2 Sheets-Sheet 2
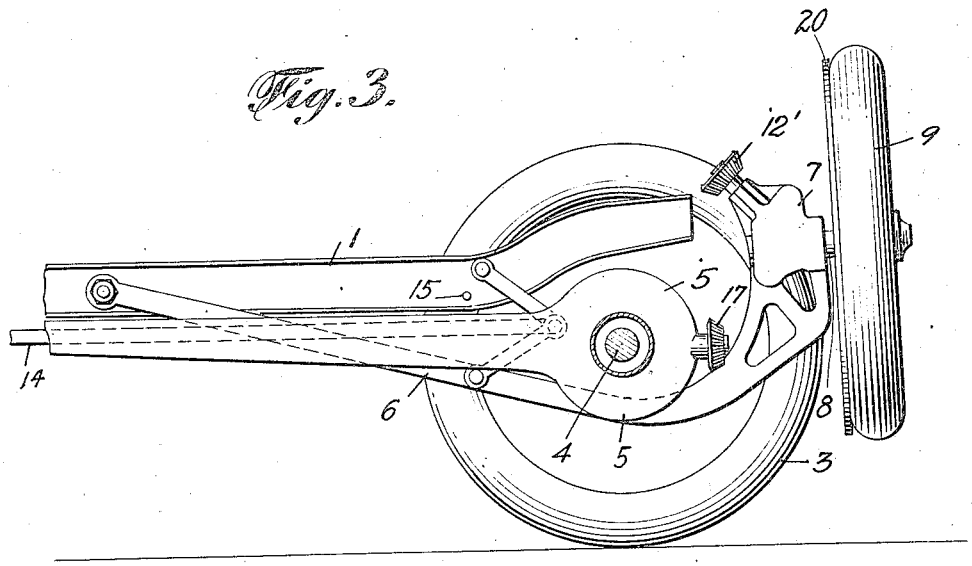
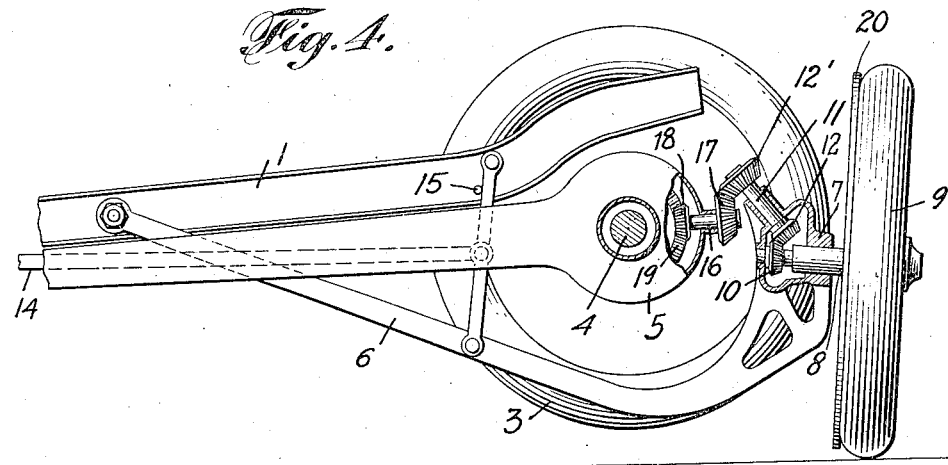

Patented Dec. 6, 1927.

1,651,727

UNITED STATES PATENT OFFICE.

CLEMENS PIRQUET, OF VIENNA, AUSTRIA, ASSIGNOR TO ALEXANDER KONTA, OF NEW YORK, N. Y.

VEHICLE.

Application filed October 4, 1923. Serial No. 666,446.

My invention has for its principal object the production of a vehicle provided with simple and effective means permitting the vehicle to be expeditiously turned or swung around on its forward end as a pivot whereby a quick reversal of the position of the vehicle may be effected when so desired. The invention is peculiarly applicable to motor or other power-driven vehicles, the power being used to actuate the turning or swinging means.

Briefly stated the invention consists in the provision of a supplemental or auxiliary wheel for the vehicle, for example, the usual spare tire or wheel of the vehicle which normally is in inoperative position at or adjacent the rear end of the vehicle and which lies in a plane transversely to the plane of the other wheels. When it is desired to effect a turning of the vehicle the auxiliary wheel is brought into engagement with the ground and the rear end of the vehicle is raised to release the rear wheels from engagement with the ground so that the vehicle is then supported by the auxiliary wheel at its rear end and by the front wheels of the vehicle at its forward end. The fifth wheel is operatively connected with the motor or other driving means of the vehicle so that when power is applied to the engine the auxiliary wheel rotates and the vehicle is turned or swung about its forward end as a pivot through any desired angle, whereby a reversal of or other change position of the vehicle may be quickly effected. The turning is effected without a forward or rearward movement of the vehicle thereby eliminating several operations and a frequent changing of gears which are now necessary to effect the changing of position of a power-driven vehicle.

A practical embodiment of the invention is illustrated in the accompanying drawings in which Fig. 1 is a more or less diagrammatic view of a motor vehicle showing the manner in which it is swung or turned around by means of my invention.

Fig. 2 is a plan view of a part of an automobile showing my invention applied thereto.

Fig. 3 is a front elevation of one side of the rear of the automobile showing the auxiliary wheel in inoperative position.

Fig. 4 is a similar view showing the auxiliary wheel in operative position.

Referring in detail to the drawings:

The side members of the frame or chassis of an automobile are indicated at 1 while the rear member is indicated at 2. The forward part of the automobile is not shown in Figs. 2 and 4 as it forms no part of my invention but the rear wheels are indicated at 3, their axle at 4 and its housing at 5, suitable springs being employed between the body and sides as will be readily understood. Pivoted to the side members 1 are the arms 6 of a fork, the hollow head of which is indicated at 7. Mounted in said head is a shaft 8 carrying a supplemental or auxiliary wheel 9, said shaft terminating at its inner end within the head in a bevel gear 10. The wheel 9 comprises a wheel proper and a rubber tire, both the wheel and tire being identical with the wheels and tires of the vehicle and interchangeable therewith as will be understood by interchanging either the tires or wheels as desired. A short shaft 11 angularly supported within the housing 7 carries on its inner end within the head a bevel gear 12 meshing with the bevel gear 10. The angularly arranged shaft 11 also carries on its outer end an exposed bevel gear 12'.

Each of the side members 1 of the frame or chassis has pivoted thereto one arm of a toggle 13 the other arm of which is pivoted to the arms 6 of the forked member previously described. Pivoted to the knee of each of said toggles is an operating rod 14 extending forwardly in the vehicle and which may be manipulated, that is, pulled forwardly or pushed rearwardly, by any suitable means, either by hand or by power, to actuate said toggles whereby a raising or lowering of the auxiliary wheel 9 out of or into engagement with the ground and a consequent lowering or raising of the rear end of the vehicle carrying the wheels 3 will be effected in an obvious manner. In conjunction with the means employed for actuating the operating arms 14 I may also employ any suitable form of clasp or lock for holding said operating arms in any desired position, said clasp or lock as well as the means for actuating said operating arms forming, however, no part of my present invention. I have also found it desirable to supply the side members 1 with suitable lugs or stops 15 to limit the movement of the toggles in one direction when they are actuated by the operating arms 14.

A shaft 16 is mounted in the housing 5 and carries a bevel gear 17 adapted to mesh with the bevel gear 12', as shown in Fig. 4, when the auxiliary wheel 9 engages the ground and the wheels 3 have been elevated. A bevel gear 18 is mounted on the inner end of said shaft 16 and intermeshes or is otherwise suitably and operatively connected either with a conventional form of differential 19 or with any part of the rear axle 4.

To reverse the position of the vehicle it is swung around on its forward end as a pivot, as shown in Fig. 1. This result is achieved by pulling forwardly the operating arms 14 whereby the spare wheel 9 is lowered into engagement with the ground and the rear end of the vehicle, together with the rear wheels thereof, are raised. The various parts are thus moved to the position shown in Fig. 4 from that shown in Fig. 3 with the bevel gear 12' intermeshing with the bevel gear 17. The rearward portion of the vehicle and the rear axle and wheels are then supported by the spare wheel 9 and the forward portion of the vehicle is supported by the front wheels of the vehicle. When power is applied to the motor the auxiliary wheel 9 will rotate as is manifest, motion being transmitted from the differential or other power driven member to the bevel gear 18, shaft 16, bevel gear 17, bevel gear 12', shaft 11, bevel gear 12, bevel gear 10, shaft 8 and to the wheel 9. The vehicle may thus be caused to ride around on the wheel 9 into the position desired, the front end of the vehicle acting as a pivot. The auxiliary rear wheel not only provides a convenient and efficacious means for effecting a quick turning of the vehicle but it also affords a convenient carrier for the spare tire and permits the extra or spare wheel usually carried by motor vehicles to be used thus avoiding the expense and additional weight of another wheel or wheels.

I have provided a plate 20 carried by the shaft 8, which is adapted to engage the ground to raise the rear end of the vehicle and support it in the raised position when the spare wheel is deflated as by reason of having substituted the spare tire or wheel for one of the other vehicle tires or wheels which has become deflated and which is then carried on the auxiliary frame at 9. The plate 20 will thus serve to protect an underinflated spare or auxiliary tire from injury during the use of the parking device.

It will be understood that if desired in order to limit the sagging of the rear axle beneath the frame where the frame is lifted directly as herein disclosed the usual strap snubbers or other means may be used in connection with this invention.

What I claim as my invention is:—

1. A vehicle provided with a plurality of vehicle supporting wheels, driving means for said vehicle, a supplemental vehicle wheel interchangeable with supporting wheels and mounted on said vehicle for rotation about an axis extending longitudinally of said vehicle, and means associated with said supplemental wheel for operatively connecting said supplemental wheel with said driving means.

2. In combination with a vehicle provided with a rotatable power driven member, driving and supporting wheels operatively connected with said member, means for rotating said member, a vertically movable supplemental vehicle wheel, interchangeable with said driving and supporting wheels, and means for operatively connecting said supplemental wheel with said member and means for moving said supplemental wheel vertically and simultaneously making said last named connection.

3. The combination with an automobile, of means for supporting a spare wheel on said automobile on an axis extending lengthwise of said automobile, and means for actuating said supporting means to cause said spare wheel to be moved into engagement with the ground and to lift the wheels of said automobile out of engagement with the ground, whereby said automobile may be moved laterally on said spare wheel.

4. The combination with an automobile, of a wheel supporting member mounted on said automobile for vertical movement relatively thereto and having means for rotatably supporting a spare wheel on an axis extending lengthwise of said automobile, and means for actuating said wheel supporting member to move said spare wheel into supporting contact with the ground, whereby one end of said automobile may be moved laterally on said spare wheel.

5. The combination with an automobile, of a wheel supporting member mounted on said automobile for vertical movement relatively thereto, and having means for rotatably supporting a spare wheel on an axis extending lengthwise of said automobile, means for actuating said wheel supporting member to move said spare wheel into supporting contact with the ground, and means for rotating said spare wheel while it is in contact with the ground.

6. The combination with an automobile, of a wheel supporting member mounted on said automobile for vertical movement relatively thereto, and having means for rotatably supporting a spare wheel on an axis extending lengthwise of said automobile, means for actuating said wheel supporting member to move said spare wheel into supporting contact with the ground, and power operated means for rotating said spare wheel while it is in contact with the ground.

7. The combination with an automobile having driving wheels and a motor for actuating the same, of a supporting member mounted on said automobile for vertical movement relative thereto and having means for rotatably supporting a spare wheel on an axis extending lengthwise of said automobile, means for actuating said wheel supporting member to move said spare wheel into supporting contact with the ground, and means driven by said motor to rotate said spare wheel to impart lateral movement to one end of said automobile.

8. The combination with an automobile, of a structure mounted on said automobile and adapted to support a spare tire for rotation about an axis extending lengthwise of said automobile, and means for imparting movement to said structure to cause said tire to engage the ground and lift the wheels of said automobile out of engagement with said ground, whereby said automobile may be moved laterally on said spare tire.

9. The combination with an automobile, of a structure mounted on said automobile for rotation about an axis extending lengthwise of said automobile and adapted to support a spare tire for rotation therewith, and means for imparting vertical movement to said structure to cause said tire to engage the ground and lift the wheels of said automobile out of engagement with said ground, whereby said automobile may be moved laterally on said spare tire.

10. In combination with a vehicle provided with supporting wheels and tires, an auxiliary tire mounted on said vehicle for rotation about an axis extending longitudinally of said vehicle, said tire being substantially the same as said vehicle supporting tires, a framework supporting said auxiliary tire, and means for moving said framework vertically to raise or lower said auxiliary tire with respect to said vehicle.

11. In combination with a vehicle provided with supporting wheels and tires, an auxiliary tire mounted on said vehicle for rotation about an axis extending longitudinally of said vehicle, said tire being substantially the same as said vehicle supporting tires, a framework supporting said auxiliary tire, means for moving said framework vertically to raise or lower said auxiliary tire with respect to said vehicle and a circular rotatable supporting plate supported on said framework for rotation about a longitudinal axis coincidently with the rotation of said auxiliary tire, said plate having a smaller radius than the outer periphery of said tire.

12. The combination with an automobile comprising a frame, a supporting axle associated with said frame and wheels carried by said axle, of a wheel supporting structure mounted on said frame, an auxiliary wheel rotatably mounted on said structure on an axis transverse to said axle, means for actuating said wheel supporting structure to move said auxiliary wheel into engagement with the ground and to cause the same to lift said frame and said axle, whereby said end of said automobile may be moved laterally on said wheel.

13. The combination with an automobile comprising a frame, an axle supporting said frame and wheels carried by said axle, of a structure mounted on said frame and adapted to support a spare tire for rotation about an axis transverse to said axle, means for imparting movement to said structure to cause said tire to engage the ground for causing said axle and frame to be lifted by said spare tire.

Signed at New York in the county of New York and State of New York this 3rd day of October, A. D. 1923.

CLEMENS PIRQUET.